(12) United States Patent
Kim (10) Patent No.: US 7,612,833 B2
(45) Date of Patent: Nov. 3, 2009

(54) STEREOSCOPIC DISPLAY DEVICE AND DRIVING METHOD THEREOF

(75) Inventor: Hyeok-Soo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1025 days.

(21) Appl. No.: 11/168,399

(22) Filed: Jun. 29, 2005

(65) Prior Publication Data

US 2006/0215262 A1    Sep. 28, 2006

(30) Foreign Application Priority Data

Dec. 30, 2004    (KR)    ............... 10-2004-0116719

(51) Int. Cl.
*G02F 1/1335*    (2006.01)
(52) U.S. Cl. ......................................... 349/15
(58) Field of Classification Search .............. 349/15
See application file for complete search history.

(56) References Cited

U.S. PATENT DOCUMENTS 7,515,213 B2 *    4/2009    Aramatsu    ................... 349/15

FOREIGN PATENT DOCUMENTS

JP    2005-164916    6/2005

* cited by examiner

*Primary Examiner*—David Nelms
*Assistant Examiner*—Phu Vu
(74) *Attorney, Agent, or Firm*—Birch, Stewart, Kolasch & Birch, LLP

(57) ABSTRACT

A stereoscopic display device and a method of driving the display device are provided. The device includes a display panel displaying images, and a parallax barrier panel facing the display panel. The parallax barrier panel includes at least one first barrier-zone, and first and second transmission-zones disposed between two adjacent first barrier-zones. Each of the first and second transmission-zones has white and black states alternatingly in a three-dimension mode.

42 Claims, 11 Drawing Sheets

STEREOSCOPIC DISPLAY DEVICE AND DRIVING METHOD THEREOF

This application claims the benefit of Korean Patent Application No. 10-2004-0116719, filed in Korea on Dec. 30, 2004, which is hereby incorporated by reference for all purposes as if fully set forth herein.

BACKGROUND OF THE INVENTION

1. Field of the Invention

The present invention relates to a stereoscopic display device and a driving method thereof, and more particularly, to a stereoscopic display device having a parallax barrier liquid crystal display panel and a driving method thereof.

2. Discussion of the Related Art

Until now, a two-dimensional display device is generally used. Recently, according to the high-speed of information by using a communication network with a wideband, a three-dimensional display device has been researched and developed.

In general, the three-dimensional display device displays stereoscopic images using a principle of a stereo vision through both eyes. In other words, a parallax of both eyes acts as a primary factor to display three-dimensional images. When the right and left eyes look at respective two two-dimensional images, the two two-dimensional images are transferred to the brain and then the brain mixes the two two-dimensional images. Thus, the three-dimensional images having the depth and reality are played back.

Based upon the above principle, as three-dimensional display devices displaying three-dimensional images by using two-dimensional images, a stereoscopic display device with a specific glasses, a stereoscopic display device without glasses, a holographic display device and so on have been used. The stereoscopic display device with a specific glasses has disadvantages such as inconvenience and unnaturalness due to wearing the separate specific glasses. The holographic display device has a technical difficulty due to using a laser reference beam and has a requirement for a large space due to the large size of the equipment. However, the stereoscopic display device without glasses does not require a separate specific glasses and its equipment is simple. The stereoscopic display devices without glasses are divided into a parallax barrier type, a lenticular type and an integral photography type. Of these types, presently, the parallax barrier type has been mainly used.

Figure 1:
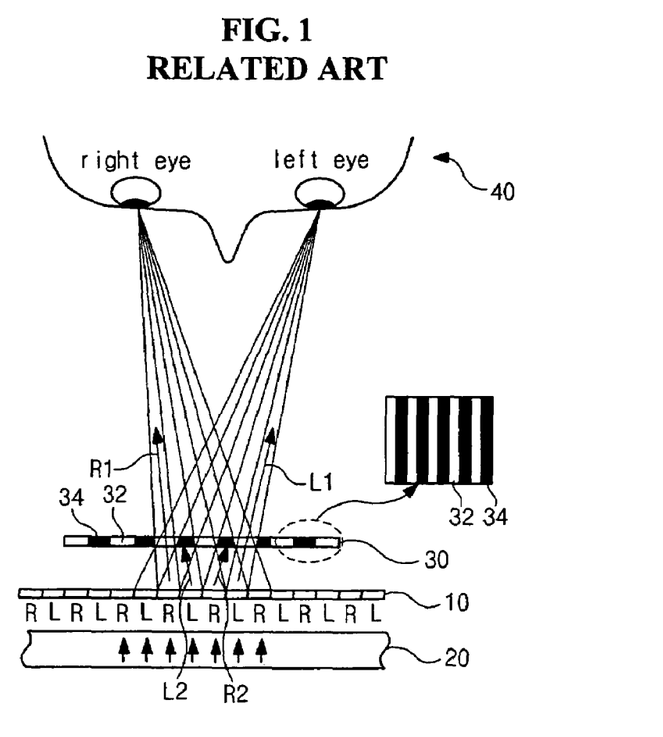
FIG. 1 is a cross-sectional view illustrating a parallax barrier type stereoscopic display device according to the related art.

FIG. 1 is a cross-sectional view illustrating a parallax barrier type stereoscopic display device according to the related art.

As shown in FIG. 1, the parallax barrier type stereoscopic display device includes a liquid crystal display panel 10, a backlight 20 below the liquid crystal display panel 10, and a parallax barrier 30 between the liquid crystal display panel 10 and an observer 40. A left eye pixel L and a right eye pixel R are alternatingly formed in the liquid crystal display panel 10. A slit 32 and a barrier 34 are alternatingly formed in the parallax barrier 30. Each of the slits 32 and the barriers 34 has a stripe pattern. Of lights emitted from the backlight 20, a first light L1 passing through the left eye pixel L goes to the observer's left eye through the slit 32, while the second light R1 passing through the right eye pixel R goes to the observer's right eye through the slit 32. Images displayed through the left and right eye pixels L and R have parallax information which human can sufficiently perceive. Thus, the observer 40 perceives three-dimensional images.

However, since the slits and barriers are fixed, the parallax barrier type display device is used only for displaying three-dimensional images. To solve this limitation, the stereoscopic display device converting between a two-dimension mode and a three-dimension mode has been used.

Figure 2A:
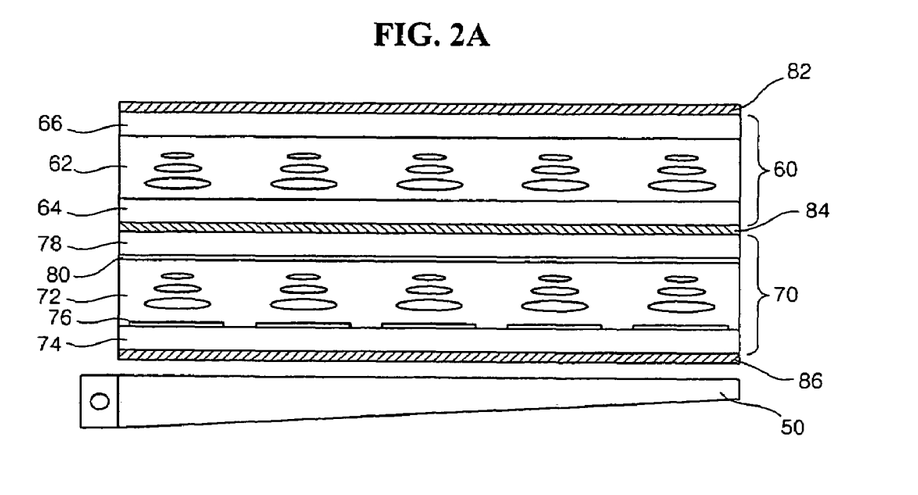
FIGS. 2A and 2B are cross-sectional views illustrating a two-dimension mode and a three-dimension mode, respectively, of a stereoscopic display device having a parallax barrier liquid crystal panel according to the related art.
Figure 2B:
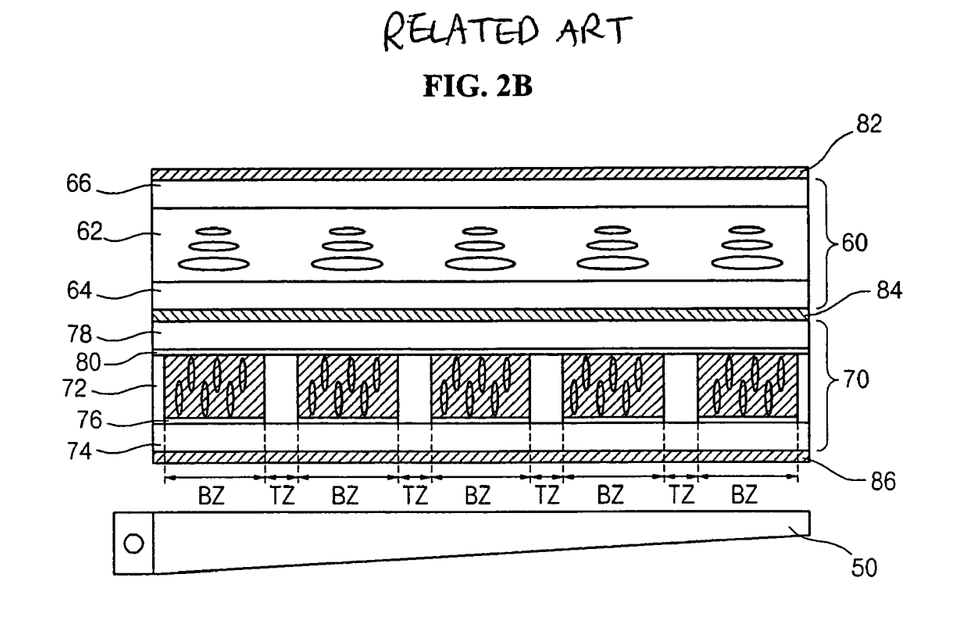

FIGS. 2A and 2B are cross-sectional views illustrating a two-dimension mode and a three-dimension mode, respectively, of a stereoscopic display device having a parallax barrier liquid crystal panel according to the related art.

As shown in FIGS. 2A and 2B, the stereoscopic display device includes a backlight 50, a main liquid crystal panel 60, and a parallax barrier liquid crystal panel 70 between the backlight 50 and the main liquid crystal panel 60. The main liquid crystal panel 60 includes first and second substrates 64 and 66, and a first liquid crystal layer 62 between the first and second substrates 64 and 66. Though not shown in the drawings, a plurality of pixel electrodes and thin film transistors (TFTs) are disposed in a matrix form on the first substrate 64, and a plurality of color filter patterns, a black matrix and a first common electrode are disposed below the second substrate 66.

The parallax barrier liquid crystal panel 70 includes third and fourth substrates 74 and 78, and a second liquid crystal layer 72 between the third and fourth substrates 74 and 78. A barrier electrode 76 having a stripe pattern is disposed on the third substrate 74 and a second common electrode 80 is disposed below the fourth substrate 78. The barrier electrode 76 and the common electrode 80 are transparent. First, second and third polarizing plates 82, 84 and 86 are formed respectively on the second substrate 66, between the main liquid crystal panel 60 and the parallax barrier liquid crystal panel 70, and below the third substrate 74.

Suppose that the parallax barrier liquid crystal panel 70 is driven by a Normally White (NW) mode, the parallax barrier liquid crystal panel 70 has a white state in a two-dimensional mode.

As shown in FIG. 2A, in a two-dimension mode, no driving voltage is applied to the barrier electrode 76, and thus the parallax barrier liquid crystal panel 70 has a normally white state entirely. Accordingly, the light emitted from the backlight 50 is transmitted through the parallax barrier liquid crystal panel 70. As a result, an observer can see plane images (i.e., two-dimensional images) of the main liquid crystal panel 60. On the contrary, as shown in FIG. 2B, in a three-dimension mode, a driving voltage is applied to the barrier electrode 76, and thus the second liquid crystal layer 72 between the barrier electrode 76 and the second common electrode 80 is driven. Accordingly, a zone of the parallax barrier liquid crystal panel corresponding to the barrier electrode 76 shields the light emitted from the backlight 50, which is referred to as a barrier-zone BZ having a black state. On the contrary, a zone between the barrier zones BZ transmits the light emitted from the backlight 50, and thus it is referred to as a transmission zone TZ having a white state. The barrier-zone B and the transmission-zone T respectively act as a barrier and a slit, as shown in FIG. 1. Accordingly, an observer can perceive two-dimensional images (plane images) of the main liquid crystal display panel 60 as three-dimensional images (stereo images). As a result, a dimension mode of the stereoscopic display device can be selectively converted between a two-dimension mode and a three-dimension mode in accordance with the on/off states of the barrier electrode 76.

Figure 3:
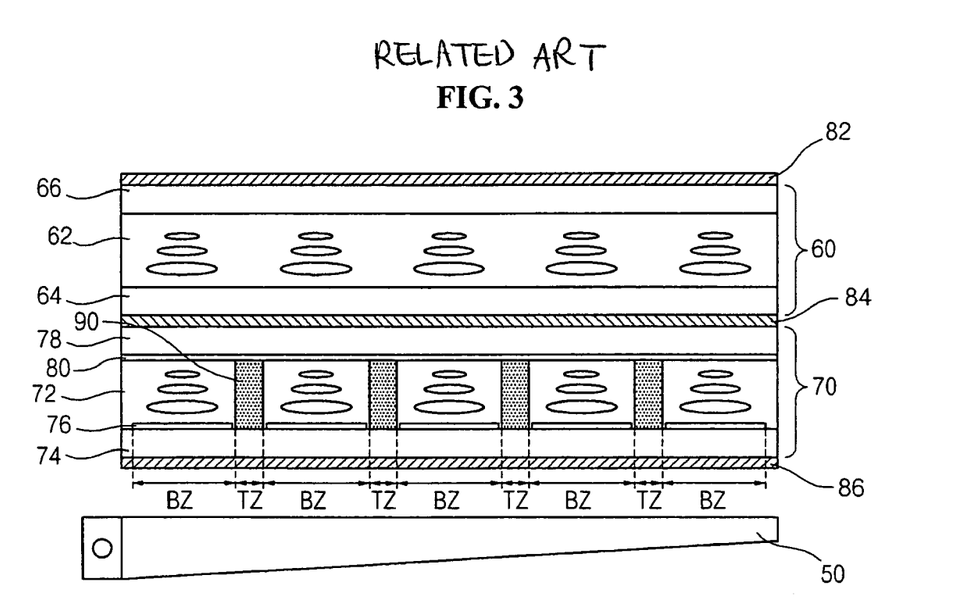
FIG. 3 is a cross-sectional view illustrating another stereoscopic display device having a parallax barrier liquid crystal panel according to the related art.

FIG. 3 is a cross-sectional view illustrating another stereoscopic display device having a parallax barrier liquid crystal panel according to the related art. Detailed explanations of parts similar to parts of FIGS. 2A and 2B will be omitted.

As shown in FIG. 3, a stereoscopic display device includes a main liquid crystal panel 60, a backlight 50 and a parallax barrier liquid crystal panel 70 similarly to the stereoscopic display device of FIGS. 2A and 2B. However, the parallax barrier liquid crystal panel 70 has structures different from the structures of the parallax barrier liquid crystal panel of FIGS. 2A and 2B. In other words, in a transmission-zone TZ, a partition wall 90 of transparent photo acryl is formed instead of a liquid crystal layer 72, and in a barrier-zone BZ, the liquid crystal layer 72 is formed. Accordingly, a boundary between the transmission-zone TZ and the barrier-zone BZ is distinctly divided, and the stereoscopic display device selectively displays a two-dimensional image and a three-dimensional image.

Figure 4:
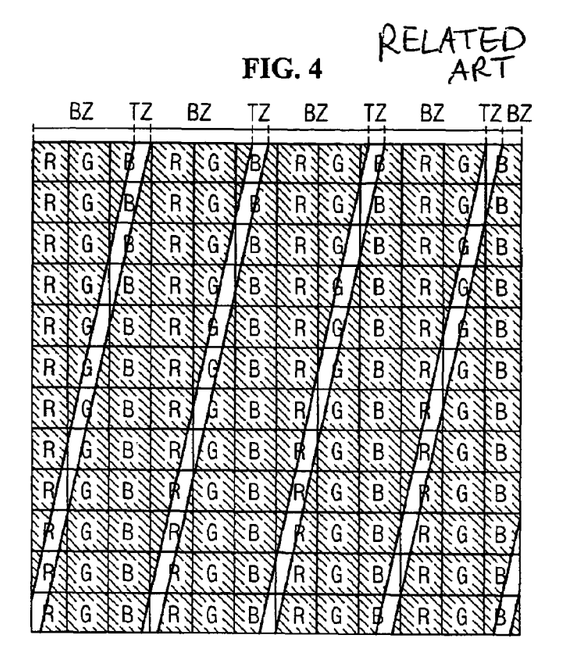
FIG. 4 is a conceptual plan view illustrating a screen in a three-dimension mode of the related art stereoscopic display device having a parallax barrier liquid crystal panel.

As explained above, the related art stereoscopic display devices having the parallax barrier liquid crystal panel have advantages, such as a selective conversion between a two-dimension mode and a three-dimension mode. However, the related art stereoscopic display devices have disadvantages, such as a low brightness and a low sensory resolution in a three-dimension mode. In other words, as a width of the transmission-zone TZ decreases, a sensory resolution increases. However, as a width of the transmission-zone TZ decreases, an aperture ratio also decreases and thus a brightness decreases. FIG. 4 is a conceptual plan view illustrating a screen in a three-dimension mode of the related art stereoscopic display device having a parallax barrier liquid crystal panel. As shown in FIG. 4, an area of a transmission-zone TZ is very small. Accordingly, if the area of the transmission-zone T becomes smaller, the aperture ratio and the brightness decrease rapidly. Characters R, G and B represent red, green and blue pixels of the main liquid crystal panel. As a result, the related art stereoscopic display device has limits to displaying three-dimensional images because the sensory resolution decreases for maintaining the brightness to some degree.

SUMMARY OF THE INVENTION

Accordingly, the present invention is directed to a stereoscopic display device that substantially obviates one or more of problems due to limitations and disadvantages of the related art.

An object of the present invention is to provide a stereoscopic display device that improves a sensory resolution and a brightness.

An another object of the present invention is to provide a method of driving a stereoscopic display device that improves a sensory resolution and a brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, according to an aspect of the present invention, there is provided a stereoscopic display device comprising: a display panel displaying images; and a parallax barrier panel facing the display panel and including at least one first barrier-zone, and first and second transmission-zones disposed between two adjacent first barrier-zones, wherein each of the first and second transmission-zones has white and black states alternatingly in a three-dimension mode.

In another aspect of the present invention, there is provided a stereoscopic display device comprising: a display panel displaying images; and a parallax barrier panel supplying light to the display panel, and including at least one first barrier-zone and first and second transmission-zones disposed between two adjacent first barrier-zones, wherein each of the first and second transmission-zones supplies and shuts light alternatingly in a three-dimension mode.

In another aspect of the present invention, there is provided a method of driving a stereoscopic display device, the method comprising: displaying images in a display panel; and driving a parallax barrier panel having at least one first barrier-zone, and first and second transmission-zones between two adjacent first barrier-zones, wherein in a three-dimension mode, the driving step includes: shielding light incident to the first barrier-zone, and alternatingly shielding and passing light incident to each of the first and second transmission-zones.

In another aspect of the present invention, there is provided a method of driving a stereoscopic display device, the method comprising: displaying images in a display panel; and driving a parallax barrier panel having at least one first barrier-zone, and first and second transmission-zones between two adjacent first barrier zones, wherein in a three-dimension mode, the driving step includes: shutting light from the first barrier-zone, and alternatingly shutting and supplying light from each of the first and second transmission-zones.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 5:
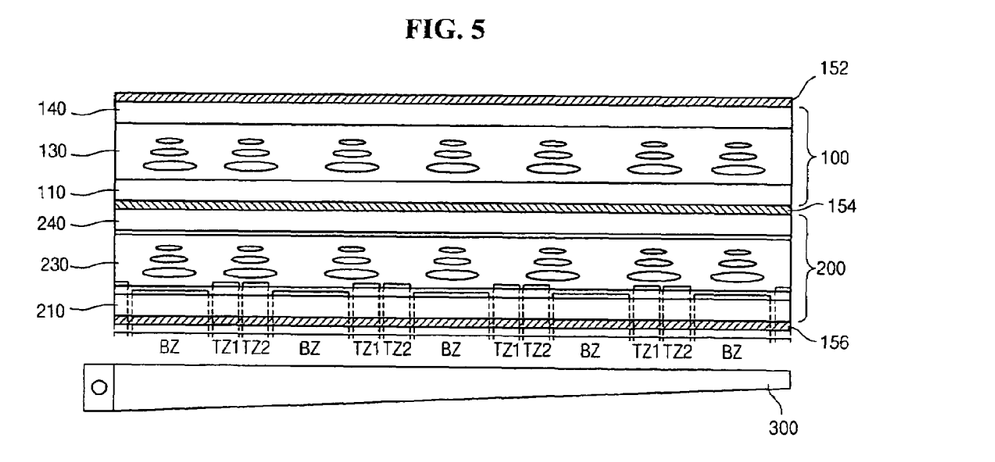
FIG. 5 is a cross-sectional view illustrating a stereoscopic display device according to a first exemplary embodiment of the present invention.

FIG. 5 is a cross-sectional view illustrating a stereoscopic display device according to a first exemplary embodiment of the present invention.

As shown in FIG. 5, the stereoscopic display device includes a main liquid crystal panel 100 displaying plan images (two dimensional images), a parallax barrier liquid crystal panel 200 below the main liquid crystal panel 100, and a backlight 300 below the parallax barrier liquid crystal panel 200. Though the parallax barrier liquid crystal panel 200 is disposed below the main liquid crystal panel 100 in FIG. 5, it should be understood that the parallax barrier liquid crystal panel may be disposed above the main liquid crystal panel 100.

Figure 6:
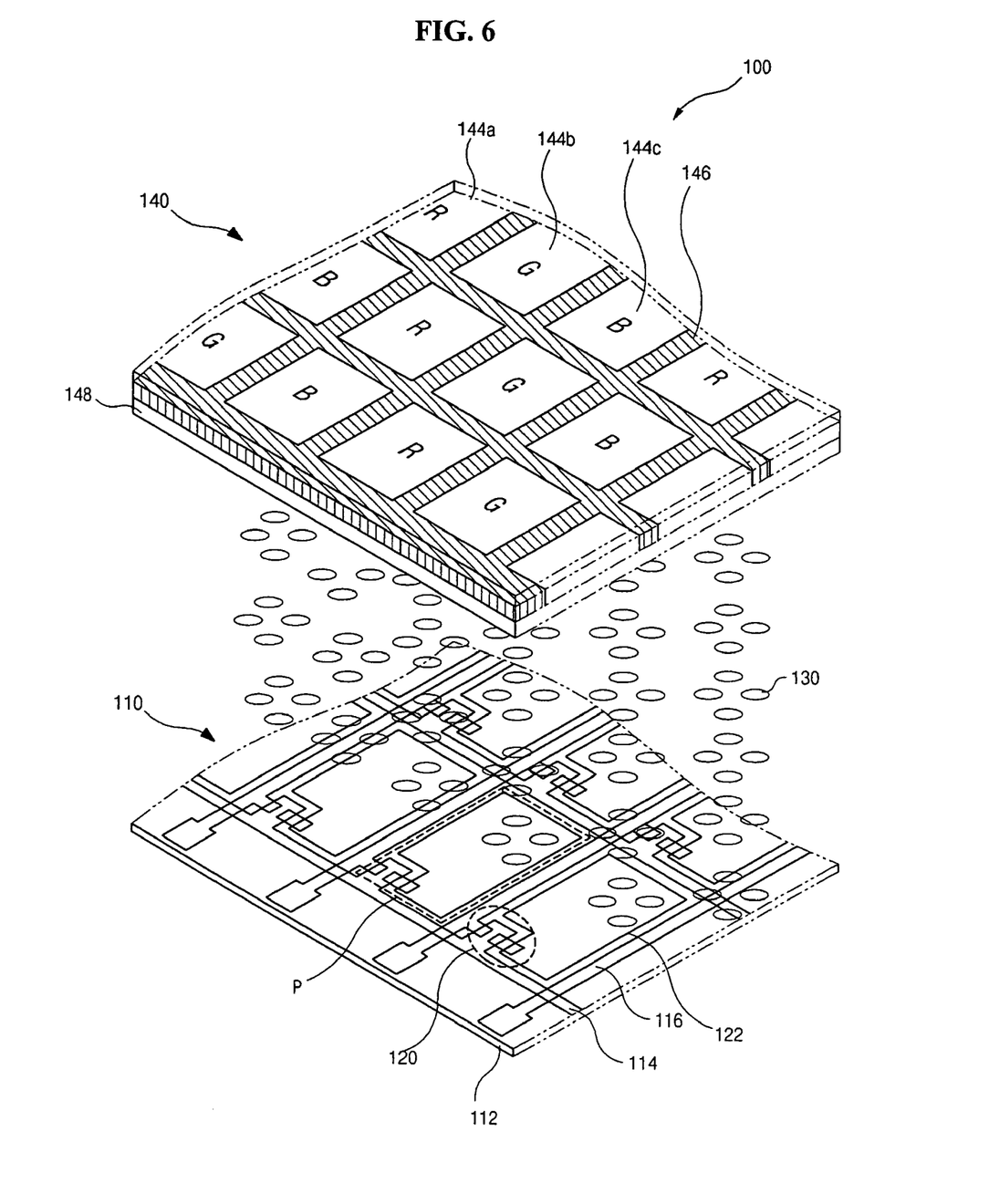
FIG. 6 is a perspective view illustrating the main liquid crystal panel 100 of FIG. 5 according to the first exemplary embodiment of the present invention.

FIG. 6 is a perspective view illustrating the main liquid crystal panel 100 of FIG. 5 according to the first exemplary embodiment of the present invention.

As shown in FIG. 6, the main liquid crystal panel 100 includes first and second substrates 110 and 140, and a first liquid crystal layer 130 between the first and second substrates 110 and 140. A plurality of gate and data lines 114 and 116 cross each other on the first substrate 110 to define a plurality of pixel regions P in a matrix form. In each pixel region, a thin film transistor 120 is disposed near a crossing of the corresponding gate and data lines 114 and 116. The thin film transistor 120 is connected to a pixel electrode 122 in each pixel region P. A black matrix 146 below the second substrate 140 defines a plurality of openings corresponding to the respective pixel regions P. Red (R), green (G) and blue (B) color filter patterns 144A, 144B and 144C are formed in the respective openings. A first common electrode 148 is formed below the black matrix 146, and the red (R), green (G) and blue (B) color filter patterns 144A, 144B and 144C. Though not shown in the drawings, first and second alignment layers are formed on the pixel electrode 122 and below the first common electrode 148, respectively, to align the liquid crystal molecules in the first liquid crystal layer 130.

The pixel electrode 122 and the first common electrode 148 face each other such that a voltage applied between the two electrodes induces an electric field across the first liquid crystal layer 130. Alignment of the liquid crystal molecules in the liquid crystal layer 130 changes in accordance with the intensity of the induced electric field into the direction of the induced electric field, thereby changing a light transmission of the main liquid crystal panel 100. Further, each color filter 144A, 144B or 144C filters the transmission-changed light having a white color to a light having the corresponding color i.e., red, green or blue. Thus, the main liquid crystal panel 100 displays plan images by varying the intensity of the induced electric field and by color-filtering.

Returning to FIG. 5, the parallax barrier liquid crystal panel 200 functions as a component selectively converting between a two-dimension mode and a three dimension mode of the stereoscopic display device. To do this, the parallax barrier liquid crystal panel 200 has a barrier-zone BZ and first and second transmission-zones TZ1 and TZ2, which are alternatingly disposed. When the stereoscopic display device is operated to display two-dimensional images in a two-dimension mode, a light passes through all the zones of the parallax barrier liquid crystal panel 200 i.e., the barrier-zone BZ and the first and second transmission-zones TZ1 and TZ2. When the stereoscopic display device is operated to display three-dimensional images in a three-dimension mode, a light passes through the first and second transmission-zones TZ1 and TZ2, but not through the barrier-zone BZ. Particularly, the first and second transmission-zones TZ1 and TZ2 alternatingly shield (or transmit) a light, and each of the first and second transmission-zones TZ1 and TZ2 transmits and shields a light alternatingly. A state transmitting a light is referred to as a white state, and a state shielding a light is referred to a black state. Each of the barrier-zone BZ and the first and second transmission-zones TZ1 and TZ2 have a stripe pattern, but may have other pattern.

Figure 7:
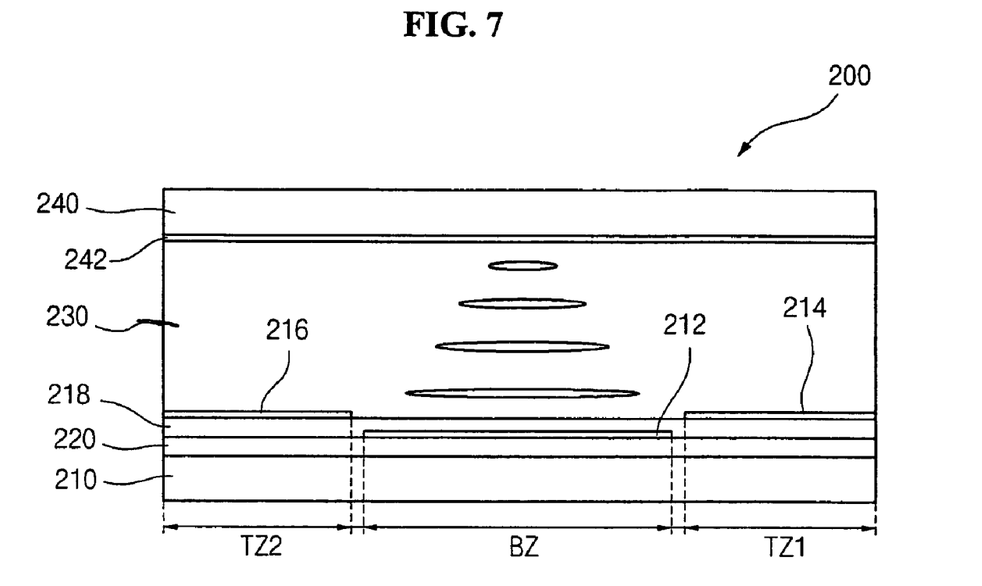
FIG. 7 is a cross-sectional view showing enlarged portions of the parallax barrier liquid crystal panel 200 of FIG. 5 according to the first exemplary embodiment of the present invention.

FIG. 7 is a cross-sectional view showing an enlarged portion of the parallax barrier liquid crystal panel 200 of FIG. 5 according to the first exemplary embodiment of the present invention.

As shown in FIG. 7, the parallax barrier liquid crystal panel 200 includes third and fourth substrates 210 and 240, and a second liquid crystal layer 230 between the third and fourth substrates 210 and 240. A barrier electrode 212 and first and second transmission electrodes 214 and 216 are disposed on the third substrate 210. The barrier electrode 212 and the first and second transmission electrodes 214 and 216 correspond to the barrier-zone BZ and the first and second transmission-zones TZ1 and TZ2, respectively. Each the barrier electrode 212 and the first and second transmission electrodes 214 and 216 has a stripe pattern/shape. The first and second transmission electrodes 214 and 216 are disposed at both side portions of the barrier electrode 212. In other words, the first and second transmission electrodes 214 and 216 are disposed between adjacent barrier electrodes 212. A second common electrode 242 is disposed below the fourth substrate 240. Each of the barrier electrode 212, the first and second transmission electrodes 214 and 216, and the second common electrode 242 may be made of a transparent conductive material, such as indium-tin-oxide (ITO) or indium-zinc-oxide (IZO).

Suppose that the parallax barrier liquid crystal panel 200 is driven by a Normally White (NW) mode, the parallax barrier liquid crystal panel 200 has a white state in a two-dimension mode. When the stereoscopic display device is operated in a two-dimension mode, no voltage is applied to the barrier electrode 212 and the first and second transmission electrodes 214 and 216. Accordingly, the parallax barrier liquid crystal panel 200 has a normally white state in the barrier-zone BZ and the first and second transmission-zones TZ1 and TZ2, and thus a light emitted from the backlight 300 is transmitted through the first and second transmission-zones TZ1 and TZ2. As a result, an observer can see plane images (two-dimensional images) of the main liquid crystal display panel 100.

On the contrary, when the stereoscopic display device is operated in a three-dimension mode, a driving voltage is applied to the barrier electrode 212. Accordingly, the second liquid crystal layer 230 between the barrier electrode 212 and the first common electrode 242 is driven, and thus the barrier-zone BZ has a black state. Further, a driving voltage is applied to the first and second transmission electrodes 214 and 216, alternatingly. Thus, the first and second transmission-zones TZ1 and TZ2 have black states alternatingly. In particularly, it is preferably that the first and second transmission-zones TZ1 and TZ2 may have opposite states to each other. In other words, at a given time, the first transmission-zone TZ1 has one of the white and black states, while the second transmission-zone TZ2 has the other of the white and black states. As a result, an observer can recognize flat images (two-dimensional images) of the main liquid crystal panel 100 as stereo images (three-dimensional images) by using the parallax barrier liquid crystal panel 200. In a three-dimension mode, the barrier-zone BZ may have a black state during one frame, the first and second transmission-zones TZ 1 and TZ2 may have at least one state-alternation.

First to third polarizing plates 152, 154 and 156 are formed respectively on the second substrate 140, between the main liquid crystal panel 100 and the parallax barrier liquid crystal panel 200, and below the third substrate 210. If a twisted nematic liquid crystal is used for the first liquid crystal layer 130, the first and third polarizing plates 152 and 156 have the same polarizing characteristic, i.e., the same polarizing axis, and the second polarizing plate 154 has an opposite polarizing characteristic to the first and third polarizing plates 152 and 156, i.e., the opposite polarizing axis by 180 degrees angle.

If the barrier electrode 212 and the transmission electrodes 214 and 216 are disposed in the same layer, the liquid crystal molecules in the second liquid crystal layer 230 at a boundary between the barrier electrode 212 and the transmission electrodes 214 and 216 are aligned abnormally by electric interference therebetween, and thus display quality is degraded. Accordingly, a first insulating layer 218 as an inter-layer is disposed between the barrier electrode 212 and the transmission electrodes 214 and 216. A buffer layer 220 is disposed between the third substrate 210 and the barrier electrode 212.

Though not shown in the drawings, third and fourth alignment layers are formed on the transmission electrodes 216 and 214, and below the second common electrode 242, respectively, to align the liquid crystal molecules in the second liquid crystal layer 230.

In the parallax barrier liquid crystal panel 200 as shown in FIGS. 5 and 7, the barrier electrode 212 and the transmission electrodes 214 and 216 are disposed on the third substrate 210, the transmission electrodes 214 and 216 are indirectly above the barrier electrode 212, and the second common electrode 242 is disposed below the fourth substrate 240. However, such vertical position relation of the barrier electrode, the transmission electrodes and the common electrode is only one example of the vertical position relation thereof, and can be modified variously.

Figure 8A:
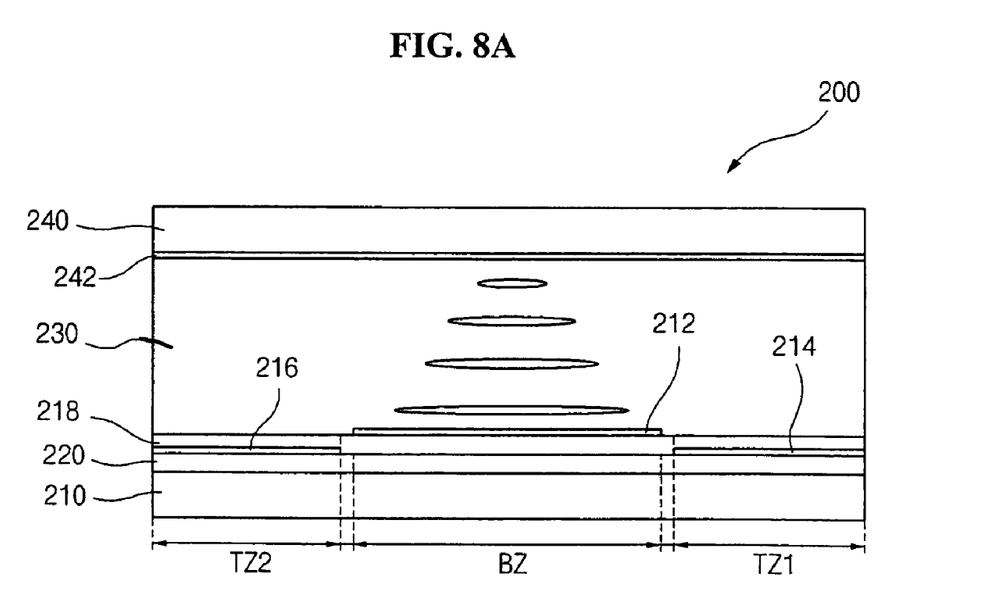
FIGS. 8A to 8C are cross-sectional views illustrating other examples of vertical position relations of the barrier electrode, the transmission electrodes, and the common electrode in the stereoscopic display device of FIG. 5 according to the first exemplary embodiment of the present invention.
Figure 8B:
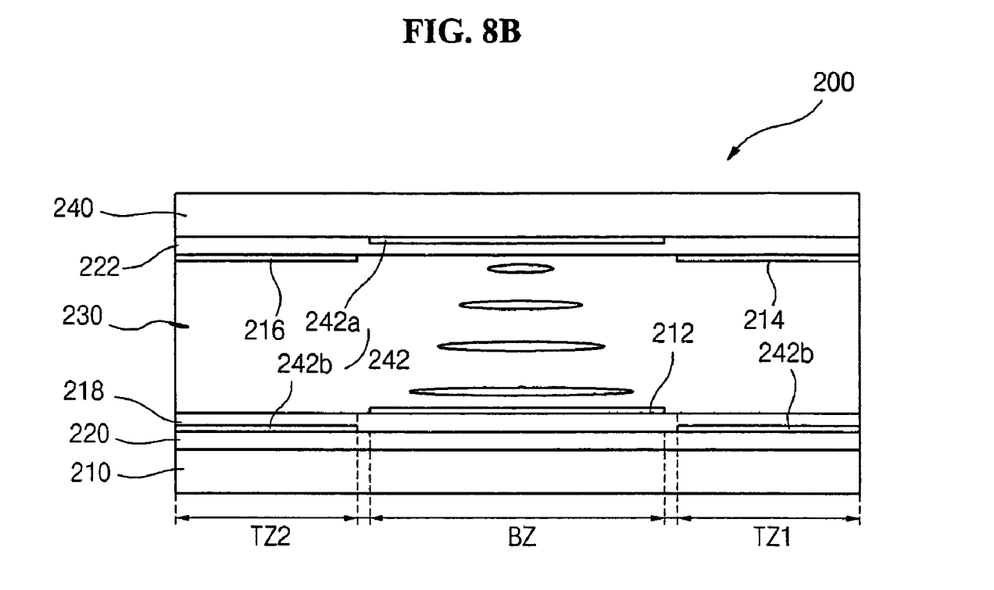
Figure 8C:
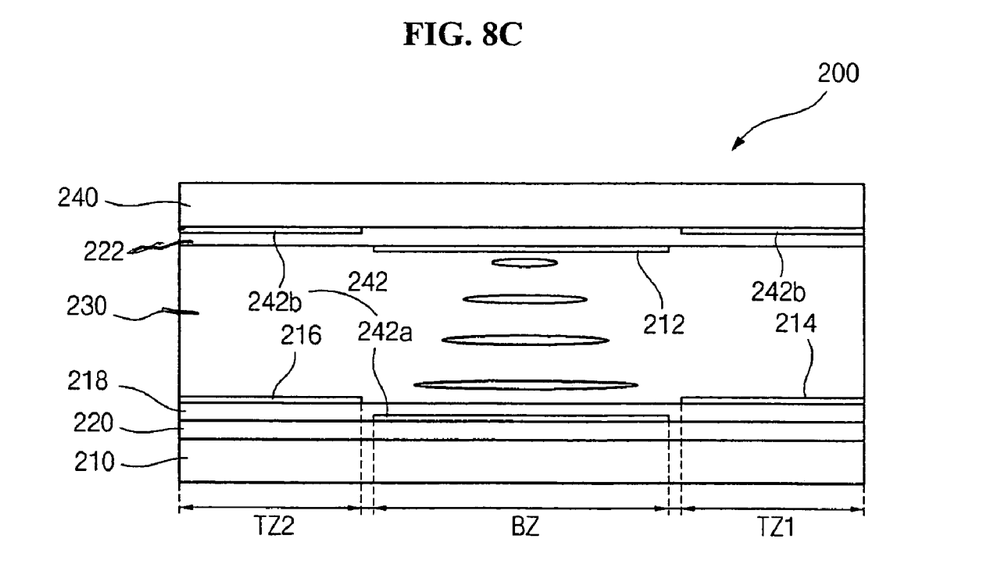

For instance, FIGS. 8A to 8C are cross-sectional views illustrating other examples of a vertical position relation of a barrier electrode, transmission electrodes, a common electrode in the stereoscopic display device of FIG. 5 according to the first exemplary embodiment of the present invention.

In one example, as shown in FIG. 8A, the vertical positions of the barrier electrode 212 and the transmission electrodes 214 and 216 are opposite to the barrier electrode and the transmission electrodes of FIG. 7. In other words, the transmission electrodes 214 and 216 are disposed on the buffer layer 220, and the first insulating layer 218 covers the first and second transmission electrodes 214 and 216. The barrier electrode 212 is disposed on the first insulating layer 218. The second common electrode 242 is disposed below the fourth substrate 240.

In another example, as shown in FIG. 8B, the barrier electrode 212 is disposed on the third substrate 210 and below the second liquid crystal layer 230, while the transmission electrodes 214 and 216 are disposed below the fourth substrate 240 but above the second liquid crystal layer 230. The second common electrode 242 includes first and second portions 242a and 242b. The first portion 242a is disposed below the fourth substrate 240 and facing the barrier electrode 212, and the second portion 242b is disposed on the third substrate 210 and facing each of the first and second transmission electrodes 214 and 216. The first insulating layer 218 is disposed between the barrier electrode 212 and the second portion 242b in order to prevent electric interference therebetween. A second insulating layer 222 is disposed between the transmission electrodes 214 and 216 and the first portion 242a in order to prevent electric interference therebetween. Further, though not shown in the drawings, vertical portions of the barrier electrode 212 and the second portion 242b may be changed, and vertical portions of the transmission electrodes 214 and 216 and the first portion 242a may be changed. For instance, the barrier electrode 212 may be disposed directly on the buffer layer 220, and the second portion 242b may be disposed directly on the first insulating layer 218. In addition or in the alternative, the transmission electrodes 214 and 216 may be disposed directly below the fourth substrate 240, and the first portion 242a may be disposed directly below the second insulating layer 222.

In still another example, as shown in FIG. 8C, the barrier electrode, the transmission electrodes and the common electrode are disposed on the substrates different from the substrates of FIG. 8B. In other words, the first portion 242a is disposed directly on the buffer layer 220, and the transmission electrodes 214 and 216 are disposed directly on the first insulating layer 218. The second portion 242b is disposed directly below the fourth substrate 240, and the barrier electrode 212 is disposed directly below the second insulating layer 222. Further, though not shown in the drawings, vertical portions of the barrier electrode 212 and the second portion 242b may be changed, and vertical portions of the transmission electrodes 214 and 216 and the first portion 242a may be changed. For instance, the transmission electrodes 214 and 216 may be disposed directly on the buffer layer 220, and the first portion 242a may be disposed directly on the first insulating layer 218. The barrier electrode 212 may be disposed directly below the fourth substrate 240, and the second portion 242b may be disposed directly below the second insulating layer 222.

As explained above, vertical position relations of the barrier electrode, the transmission electrodes and the common electrode can be modified variously according to the present invention.

Figure 9:
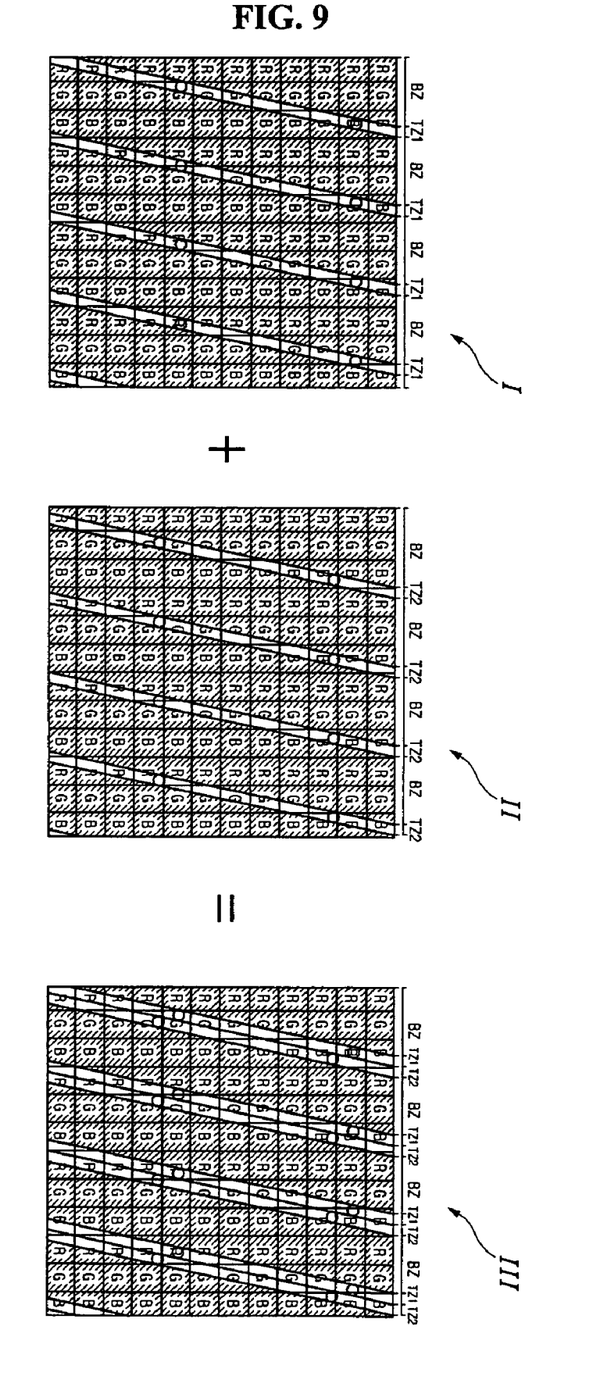
FIG. 9 is a conceptual view illustrating examples of screens in a three-dimension mode of the stereoscopic display device of FIGS. 5-8C according to the first exemplary embodiment of the present invention.

FIG. 9 is a conceptual view illustrating examples of screens in a three-dimension mode of the stereoscopic display device of FIGS. 5-8C according to the first exemplary embodiment of the present invention.

As shown in FIG. 9, I, II and III represent first, second and third screens. The first screen I is displayed in a first period when a first transmission-zone TZ1 has a white state, and a second transmission-zone TZ2 has a black state. The second screen II is displayed in a second period when the first transmission-zone TZ1 has a black state, and the second transmission-zone TZ2 has a white state. The third screen III is a mixed screen of the first and second screens I and II which an observer perceives. With respect to the number (or areas) of red (R), green (G) and blue (B) pixels having white states, the third screen III has white-stated pixels about by two times more than the first or second screen. In other words, in a three-dimension mode, the observer perceives the pixels corresponding to both the first and second transmission-zones TZ1 and TZ2, not one of the first and second transmission-zones TZ1 and TZ2. Therefore, an aperture ratio and brightness can be improved. Further, in one of the first and second period, i.e., in some times, a white state is displayed in one of the first and second transmission-zones TZ1 and TZ2. Therefore, a sensory resolution also can be improved. As a result, in accordance with controlling an area of the first and second transmission-zones TZ1 and TZ2 adequately, the observer can see stereo images (three-dimensional images) having the improved brightness and sensory resolution.

In the exemplary embodiments of the present invention, as the main panel and the parallax barrier panel, liquid crystal panels are applied. However, it should be understood that other types of panels may be used within the spirit or scope of the invention. One of the many inventive aspects of the present invention is that two transmission-zones (TZ1 and TZ2) are provided between two adjacent barrier-zones, and the two transmission-zones have states opposite to each other. In one example, when the parallax barrier panel is disposed below the main panel, the main panel may be a non-luminous type panel such as a liquid crystal panel, and the parallax barrier panel may be a non-luminous type or a luminous type panel such as an electroluminescent panel. In particular, the backlight is not required when the parallax barrier panel is the luminous type panel, the transmission zones and the barrier zone supply and shut light directly. In another example, when the parallax barrier panel is disposed on or above the main panel, the parallax panel may be a non-luminous type panel, and the main panel may be a non-luminous type panel or a luminous type panel. In particular, the backlight is not required when the main panel is the luminous type panel, the transmission zones and the barrier zone pass and shield light.

Figure 10:
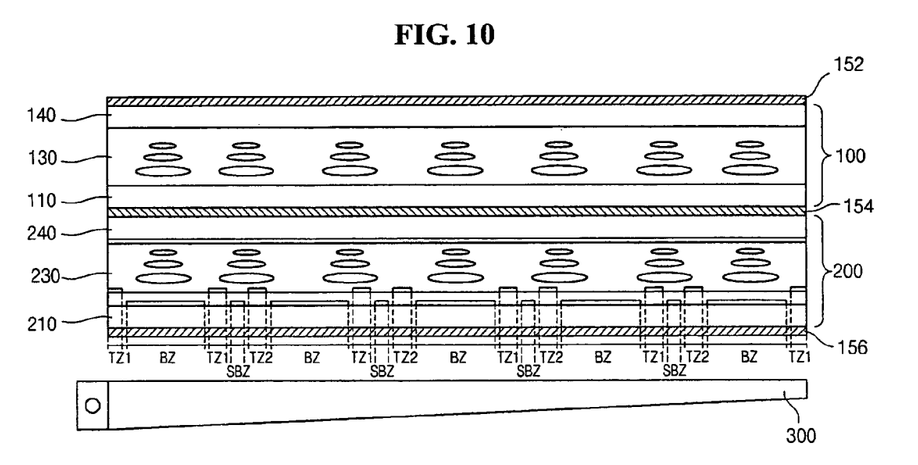
FIG. 10 is a cross-sectional view illustrating a stereoscopic display device according to a second exemplary embodiment of the present invention.

FIG. 10 is a cross-sectional view illustrating a stereoscopic display device according to a second exemplary embodiment of the present invention.

As shown in FIG. 10, the parallax barrier liquid crystal panel 200 functions as a component selectively converting between a two-dimension mode and a three-dimension mode of the stereoscopic display device. To do this, the parallax barrier liquid crystal panel 200 has a barrier-zone BZ, first and second transmission-zones TZ1 and TZ2, and a sub barrier-zone SBZ between the first and second transmission-zones TZ1 and TZ2. In such a manner, a plurality of the barrier-zones BZ, a plurality of the first and second transmission-zones TZ1 and TZ2, and a plurality of sub barrier-zones SBZ are alternatingly provided. When the stereoscopic display device is operated to display two-dimensional images in a two-dimension mode, a light from the backlight 300 passes through all the zones of the parallax barrier liquid crystal panel 200, i.e., the barrier-zones BZ, the sub barrier-zones SBZ, and the first and second transmission-zones TZ1 and TZ2. When the stereoscopic display device is operated to display three-dimensional images in a three-dimension mode, the light passes through the first and second transmission-zones TZ1 and TZ2, but not through the barrier-zone BZ and the sub barrier-zone SBZ. Particularly, the first and second transmission-zones TZ1 and TZ2 alternatingly shield (or transmit) a light, and each of the first and second transmission-zones TZ1 and TZ2 transmits and shields a light alternatingly. A state transmitting a light is referred to as a white state, and a state shielding a light is referred to a black state. Each of the barrier-zone BZ, the sub barrier-zone SBZ, and the first and second transmission-zones TZ1 and TZ2 have a stripe pattern but can have other shapes.

Figure 11:
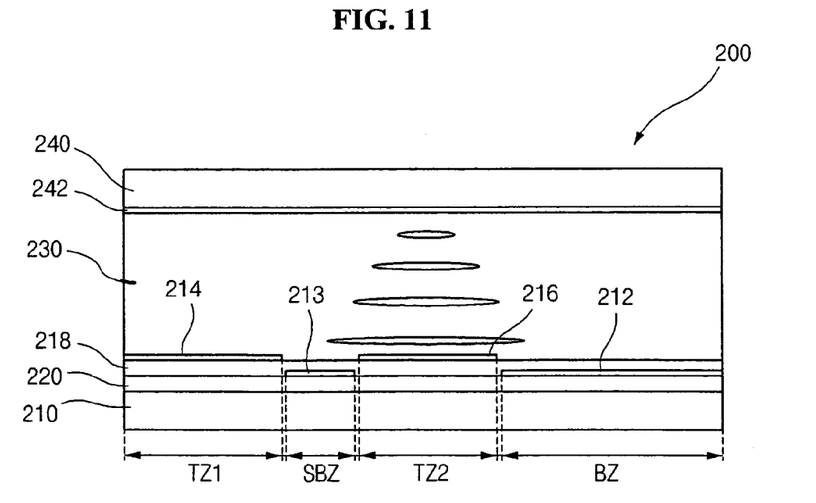
FIG. 11 is a cross-sectional view showing enlarged portions of the parallax barrier liquid crystal display panel 200 of FIG. 10 according to the second exemplary embodiment of the present invention.

FIG. 11 is a cross-sectional view showing an enlarged portion of the parallax barrier liquid crystal panel 200 of FIG. 10 according to the second exemplary embodiment of the present invention. The structure of the main liquid crystal panel 100 in FIG. 11 is the same as that of the main liquid crystal panel 100 in FIGS. 5 and 6, and thus the description thereof will be omitted for the sake of brevity.

As shown in FIG. 11, the parallax barrier liquid crystal panel 200 includes third and fourth substrates 210 and 240, and a second liquid crystal layer 230 between the third and fourth substrates 210 and 240. A barrier electrode 212, a sub barrier electrode 213, and first and second transmission electrodes 214 and 216 are disposed on the third substrate 210. The barrier electrode 212, the sub barrier electrode 213, and the first and second transmission electrodes 214 and 216 correspond to the barrier-zone BZ, the sub barrier-zone SBZ, and the first and second transmission-zones TZ1 and TZ2, respectively. Each of the barrier electrodes 212, the sub barrier electrodes 213, and the first and second transmission electrodes 214 and 216 has a stripe pattern. The first and second transmission electrodes 214 and 216 are disposed at both side portions of the barrier electrode 212. In other words, the first and second transmission electrodes 214 and 216 are disposed between two adjacent barrier electrodes 212. A second common electrode 242 is disposed below the fourth substrate 240. Each of the barrier electrodes 212, the sub barrier electrodes 213, the first and second transmission electrodes 214 and 216, and the second common electrode 242 may be made of a transparent conductive material, such as indium-tin-oxide (ITO) or indium-zinc-oxide (IZO).

Suppose that the parallax barrier liquid crystal panel 200 is driven by a Normally White (NW) mode, the parallax barrier liquid crystal panel 200 in FIG. 10 has a white state in a two-dimension mode. When the stereoscopic display device is operated in a two-dimension mode, no voltage is not applied to the barrier electrode 212, the sub barrier electrode 213, and the first and second transmission electrodes 214 and 216. Accordingly, the parallax barrier liquid crystal panel 200 has a normally white state in the barrier-zone BZ, the sub barrier-zone SBZ, and the first and second transmission-zones TZ1 and TZ2, and thus a light emitted from the backlight 300 is transmitted through the first and second transmission-zones TZ1 and TZ2. As a result, an observer can see plane images (two-dimensional images) of the main liquid crystal panel 100.

On the contrary, when the stereoscopic display device of FIG. 10 is operated in a three-dimension mode, a driving voltage is applied to the barrier electrode 212 and the sub barrier electrode 213. Accordingly, the second liquid crystal layer 230 between the barrier electrode 212 and the sub barrier electrode 213 and the first common electrode 242 is driven, and thus the barrier-zone BZ and the sub barrier-zone SBZ have a black state. Further, a driving voltage is applied to the first and second transmission electrodes 214 and 216, alternatingly. Thus, the first and second transmission-zones TZ1 and TZ2 have black states alternatingly. In particularly, it is preferably that the first and second transmission-zones TZ1 and TZ2 may have opposite states to each other at a given time. In other words, when the first transmission-zone TZ1 has one of the white and black states, the second transmission-zone TZ2 has the other of the white and black states. As a result, an observer can recognize flat images (two-dimensional images) of the main liquid crystal panel 100 as stereo images (three-dimensional images) by using the parallax barrier liquid crystal panel 200. In a three-dimension mode, the barrier-zone BZ and the sub barrier-zone SBZ may have a black state during one frame, the first and second transmission-zones TZ1 and TZ2 may have at least one state-alternation.

If the barrier electrode 212, the sub barrier electrode 213, and the transmission electrodes 214 and 216 are disposed in the same layer, the liquid crystal molecules in the second liquid crystal layer 230 at a boundary between the barrier electrode 212 and the sub barrier electrode 213, and the transmission electrodes 214 and 216 are aligned abnormally by electric interference therebetween, and thus display quality is degraded. Accordingly, a first insulating layer 218 as an inter-layer is disposed between the barrier electrode 212 and the sub barrier electrode 213 and the transmission electrodes 214 and 216. A buffer layer 220 is disposed between the third substrate 210 and the barrier electrode 212 and the sub barrier electrode 213.

Though not shown in the drawings, third and fourth alignment layers are formed on the transmission electrodes 216 and 214, and below the second common electrode 242, respectively, to align the liquid crystal molecules in the second liquid crystal layer 230.

In the parallax barrier liquid crystal panel 200 as shown in FIGS. 10 and 11, the barrier electrode 212, the sub barrier electrode 213, and the transmission electrodes 214 and 216 are disposed on the third substrate 210; the transmission electrodes 214 and 216 are indirectly above the barrier electrode 212 and the sub barrier electrode 213; and the second common electrode 242 is below the fourth substrate 240. However, such vertical position relation of the barrier electrode, the sub barrier electrode, the transmission electrodes and the common electrode is only one example of the vertical position relation thereof, and can be modified variously.

Figure 12A:
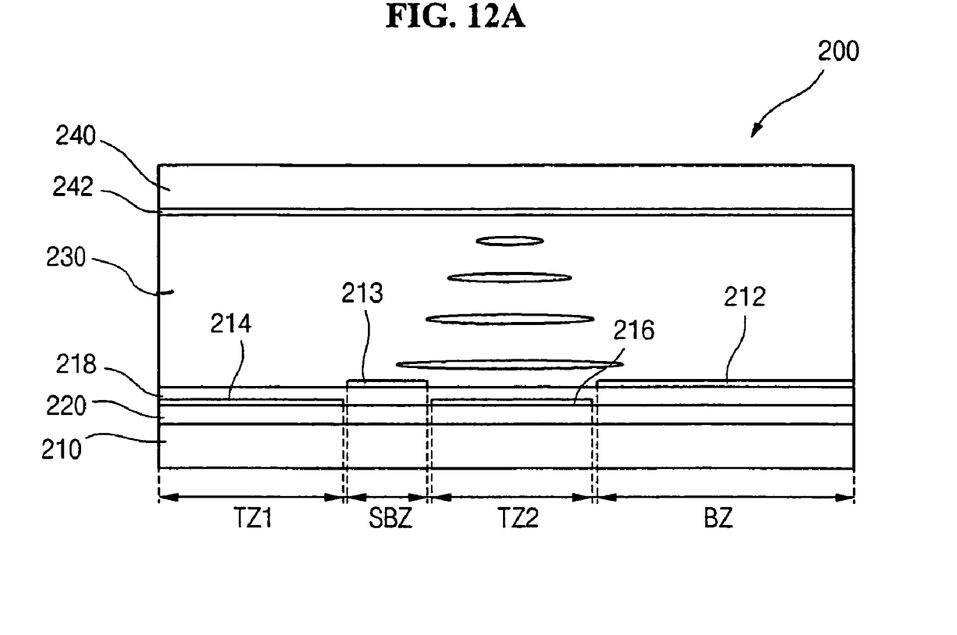
FIGS. 12A to 12C are cross-sectional views illustrating other examples of vertical position relations of the barrier electrode, the sub barrier electrode, the transmission electrodes, and the common electrode in the stereoscopic display device of FIG. 10 according to the second exemplary embodiment of the present invention.
Figure 12B:
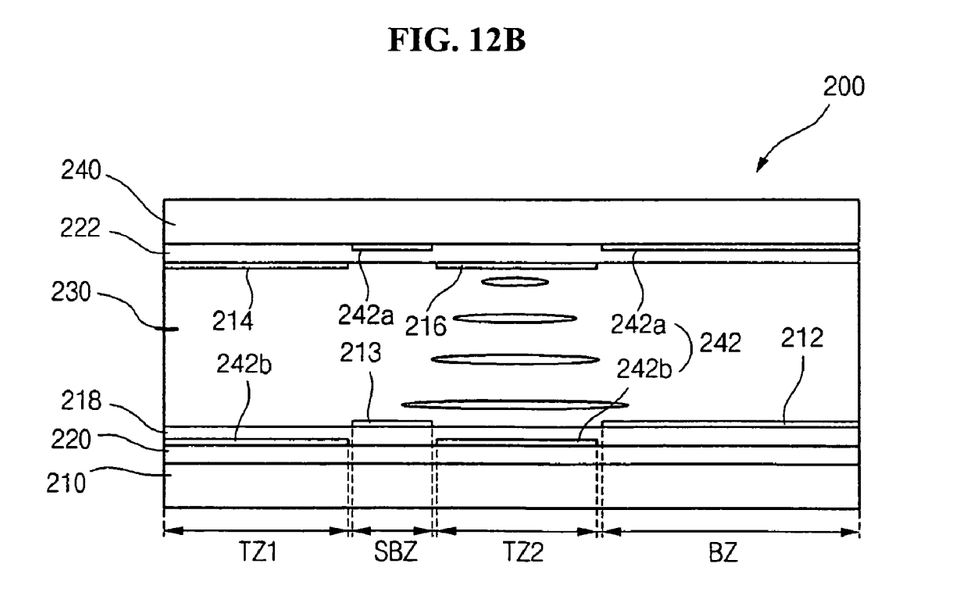
Figure 12C:
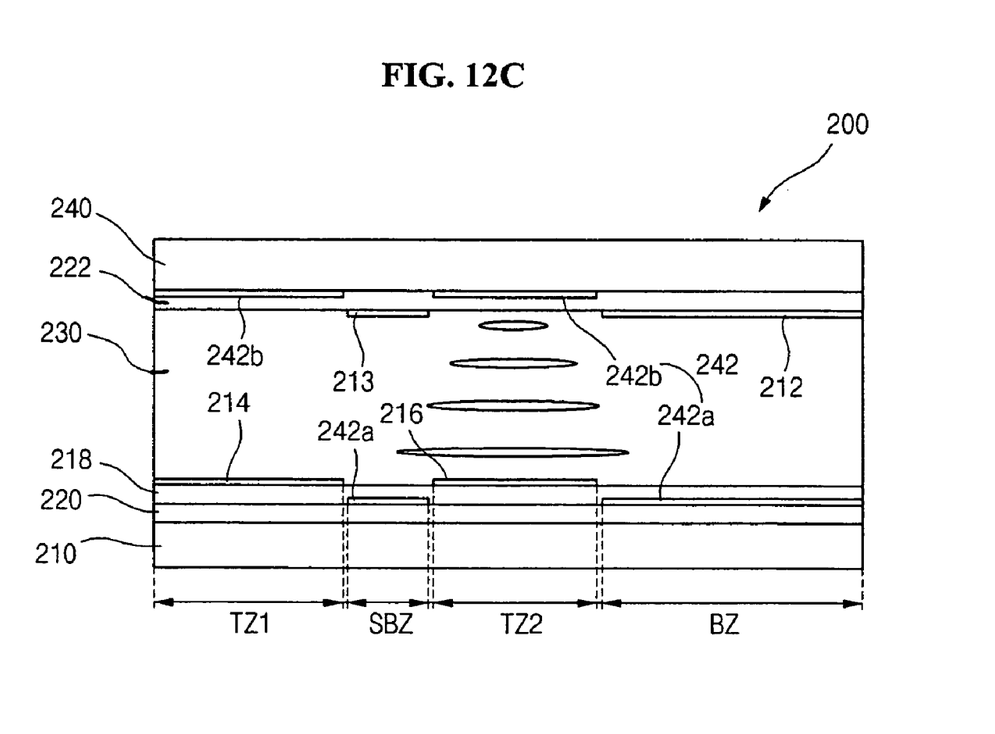

For instance, FIGS. 12A to 12C are cross-sectional views illustrating examples of a vertical position relation of a barrier electrode, a sub barrier electrode, transmission electrodes, a common electrode in the stereoscopic display device of FIG. 10 according to the second exemplary embodiment of the present invention.

In one example, as shown in FIG. 12A, the vertical positions of the barrier electrode 212, the sub barrier electrode 213 and the transmission electrodes 214 and 216 are opposite to the barrier electrode, the sub barrier electrode and the transmission electrodes of FIG. 11. In other words, the transmission electrodes 214 and 216 are disposed directly on the buffer layer 220, and the first insulating layer 218 covers the first and second transmission electrodes 214 and 216. The barrier electrode 212 and the sub barrier electrode are disposed directly on the first insulating layer 218. The second common electrode 242 is disposed below the fourth substrate 240.

In another example, as shown in FIG. 12B, the barrier electrode 212 and the sub barrier electrode 213 are disposed on the third substrate 210, while the transmission electrodes 214 and 216 are disposed below the fourth substrate 240. The second common electrode 242 includes first and second portions 242a and 242b. The first portion 242a is disposed directly below the fourth substrate 240 and facing the barrier electrode 212 and the sub barrier electrode 213. The second portion 242b is disposed directly on the buffer layer 220 and facing each of the first and second transmission electrodes 214 and 216. The first insulating layer 218 is disposed between the barrier electrode 212 and the sub barrier electrode 213 and the second portion 242b in order to prevent electric interference therebetween. The second insulating layer 222 is disposed between the transmission electrodes 214 and 216 and the first portion 242a in order to prevent electric interference therebetween. Further, though not shown in the drawings, vertical portions of the barrier electrode 212 and the sub barrier electrode 213 and the second portion 242a may be changed, and vertical portions of the transmission electrodes 214 and 216 and the first portion 242a may be changed. For instance, the barrier electrode 212 and the sub barrier electrode 213 may be disposed directly on the buffer layer 220, and the second portion 242b may be disposed directly on the first insulating layer 218. The transmission electrodes 214 and 216 may be disposed directly below the fourth substrate 240, and the first portion 242a may be disposed directly below the second insulating layer 222.

In still another example, as shown in FIG. 12C, the barrier electrode 212, the sub barrier electrode 213, the transmission electrodes 214 and 216 and the common electrode 242 are disposed on the substrates different from the substrates of FIG. 12B. In other words, the first portion 242a is now disposed directly on the buffer layer 220, and the transmission electrodes 214 and 216 are disposed directly on the first insulating layer 218. The second portion 242b is disposed directly below the fourth substrate 240, and the barrier electrode 212 and the sub barrier electrode 213 are disposed directly below the second insulating layer 222. Further, though not shown in the drawings, vertical portions of the barrier electrode 212 and the sub barrier electrode 213 and the second portion 242b may be changed, and vertical portions of the transmission electrodes 214 and 216 and the first portion 242a may be changed. For instance, the transmission electrodes 214 and 216 may be disposed directly on the buffer layer 220, and the first portion 242a may be disposed directly on the first insulating layer 218. The barrier electrode 212 and the sub barrier electrode 213 may be disposed directly below the fourth substrate 240, and the second portion 242b may be disposed directly below the second insulating layer 222.

As explained above, vertical position relations of the barrier electrode, the sub barrier electrode, the transmission electrodes and the common electrode can be modified variously.

Figure 13:
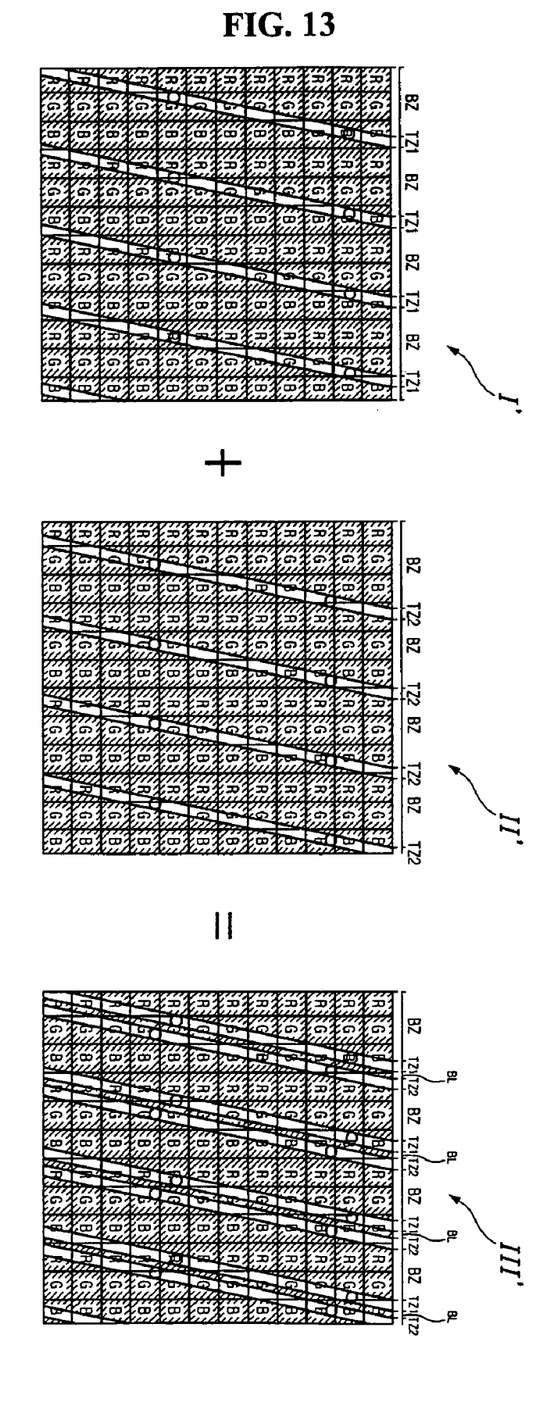
FIG. 13 is a conceptual view illustrating examples of screens in a three-dimension mode of the stereoscopic display device of FIGS. 10-12C according to the second exemplary embodiment of the present invention.

FIG. 13 is a conceptual view illustrating examples of screens in a three-dimension mode of the stereoscopic display device of FIGS. 10-12C according to the second exemplary embodiment of the present invention.

As shown in FIG. 13, I, II and III represent first, second and third screens. The first screen I is displayed in a first period when a first transmission-zone TZ1 has a white state, and a second transmission-zone TZ2 has a black state. The second screen II is displayed in a second period when the first transmission-zone TZ1 has a black state, and the second transmission-zone TZ2 has a white state. The third screen III is a mixed screen of the first and second screens I and II which an observer perceives. With respect to the number (or areas) of red (R), green (G) and blue (B) pixels having white states, the third screen III has white-stated pixels about by two times more than the first or second screen. In other words, in a three-dimension mode, the observer perceives the pixels corresponding to both the first and second transmission-zones TZ1 and TZ2, not one of the first and second transmission-zones TZ1 and TZ2. Therefore, an aperture ratio and brightness can be improved. Further, in one of the first and second period, i.e., in some times, a white state is displayed in one of the first and second transmission-zones TZ1 and TZ2. Therefore, a sensory resolution also can be improved. Further, the white state is displayed in the first and second transmission-zones TZ1 and TZ2 having a shape divided by the sub barrier-zone SBZ. Therefore, a sensory resolution can be more improved than the first exemplary embodiment. As a result, in accordance with controlling an area of the first and second transmission-zones TZ1 and TZ2 adequately, the observer can see stereo images (three-dimensional images) having the improved brightness and sensory resolution.

In the exemplary embodiments of the present invention, as the main panel and the parallax barrier panel, liquid crystal panels are applied. However, it should be understood that other types of panels may be used within the spirit or scope of the invention. One of many inventive aspects of the present invention is that two transmission-zones (TZ1 and TZ2) are provided between two adjacent barrier-zones, and the two transmission-zones have states opposite to each other. In one example, when the parallax barrier panel is disposed below the main panel, the main panel may be a non-luminous type panel such as a liquid crystal panel, and the parallax barrier panel may be a non-luminous type or a luminous type panel such as an electroluminescent panel. In particular, the backlight is not required when the parallax barrier panel is the luminous type panel, the transmission-zones, the barrier-zone supply, and the sub barrier-zone supply and shut light directly. In another example, when the parallax barrier panel is disposed on or above the main panel, the parallax panel may be a non-luminous type panel, and the main panel may be a non-luminous type panel or a luminous type panel. In particular, the backlight is not required when the main panel is the luminous type panel, the transmission-zones, the barrier-zone, and the sub barrier-zone pass and shield light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stereoscopic display device comprising:
 a display panel displaying images; and
 a parallax barrier panel facing the display panel and including at least one first barrier-zone, and first and second transmission-zones disposed between two adjacent first barrier-zones,
 wherein each of the first and second transmission-zones has white and black states alternatingly in a three-dimension mode.

2. The device according to claim 1, wherein each of the first barrier-zone and the first and second transmission-zones has a white state in a two-dimension mode, and the first barrier-zone has a black state in the three-dimension mode.

3. The device according to claim 1, wherein the parallax barrier panel includes:
 a first barrier electrode corresponding to the first barrier-zone; and
 first and second transmission electrodes corresponding to the first and second transmission-zones, respectively.

4. The device according to claim 3, wherein the parallax barrier panel further includes:
 first and second-substrates facing each other; and
 a common electrode disposed between the first and second substrates.

5. The device according to claim 4, wherein the first barrier electrode and the first and second transmission electrodes are disposed on an inner surface of the first substrate, and the common electrode is disposed on an inner surface of the second substrate.

6. The device according to claim 4, wherein the parallax barrier panel further includes an insulator on the first substrate between the first barrier electrode and the first and second transmission electrodes.

7. The device according to claim 6, wherein the first barrier electrode is disposed between the first substrate and the insulator, and the first and second transmission electrodes are disposed on the insulator.

8. The device according to claim 6, wherein the first and second transmission electrodes are disposed between the first substrate and the insulator, and the first barrier electrode is disposed on the insulator.

9. The device according to claim 4, wherein the common electrode includes a first portion facing the first barrier-zone and a second portion facing the first and second transmission zones.

10. The device according to claim 9, wherein the first and second transmission electrodes and the first portion of the common electrode are disposed on an inner surface of one of the first and second substrates, and the first barrier electrode and the second portion of the common electrode are disposed on an inner surface of the other one of the first and second substrates.

11. The device according to claim 10, wherein the parallax barrier panel further includes a first insulator between the first portion of the common electrode and the first and second transmission electrodes, and a second insulator between the second portion of the common electrode and the first barrier electrode.

12. The device according to claim 11, wherein the first portion of the common electrode is disposed between the first substrate and the first insulator, and the first and second transmission electrodes are disposed on the first insulator, and wherein the second portion of the common electrode is disposed between the second substrate and the second insulator, and the first barrier electrode is disposed on the second insulator.

13. The device according to claim 11, wherein the first and second transmission electrodes are disposed between the first substrate and the first insulator, and the first portion of the common electrode is disposed on the first insulator, and wherein the first barrier electrode is disposed between the second substrate and the second insulator, and the second portion of the common electrode is disposed on the second insulator.

14. The device according to claim 11, wherein the first portion of the common electrode is disposed between the second substrate and the second insulator, and the first and second transmission electrodes are disposed on the second insulator, and wherein the second portion of the common electrode is disposed between the first substrate and the first insulator, and the first barrier electrode is disposed on the first insulator.

15. The device according to claim 11, wherein the first and second transmission electrodes are disposed between the second substrate and the second insulator, and the first portion of the common electrode is disposed on the second insulator, and wherein the first barrier electrode is disposed between the first substrate and the first insulator, and the second portion of the common electrode is disposed on the first insulator.

16. The device according to claim 4, wherein the parallax barrier panel further includes a second barrier-zone between the adjacent first and second transmission-zones, and a second barrier electrode corresponding to the second barrier-zone.

17. The device according to claim 16, wherein the first and second barrier electrodes and the first and second transmission electrodes are disposed on an inner surface of the first substrate, and the common electrode is disposed on an inner surface of the second substrate.

18. The device according to claim 16, wherein the parallax barrier panel further includes an insulator on the first substrate between the first and second barrier electrodes and the first and second transmission electrodes.

19. The device according to claim 18, wherein the first and second barrier electrodes are disposed between the first substrate and the insulator, and the first and second transmission electrodes are disposed on the insulator.

20. The device according to claim 18, wherein the first and second transmission electrodes are disposed between the first substrate and the insulator, and the first and second barrier electrodes are disposed on the insulator.

21. The device according to claim 16, wherein the common electrode includes a first portion facing the first and second barrier-zones and a second portion facing the first and second transmission zones.

22. The device according to claim 21, wherein the first and second transmission electrodes and the first portion of the common electrode are disposed on an inner surface of one of the first and second substrates, and the first and second barrier electrodes and the second portion of the common electrode are disposed on an inner surface of the other one of the first and second substrates.

23. The device according to claim 22, wherein the parallax barrier panel further includes a first insulator between the first portion of the common electrode and the first and second transmission electrodes, and a second insulator between the second portion of the common electrode and the first and second barrier electrodes.

24. The device according to claim 23, wherein the first portion of the common electrode is disposed between the first substrate and the first insulator, and the first and second transmission electrodes are disposed on the first insulator, and wherein the second portion of the common electrode is disposed between the second substrate and the second insulator, and the first and second barrier electrodes are disposed on the second insulator.

25. The device according to claim 23, wherein the first and second transmission electrodes are disposed between the first substrate and the first insulator, and the first portion of the common electrode is disposed on the first insulator, and wherein the first and second barrier electrodes are disposed between the second substrate and the second insulator, and the second portion of the common electrode is disposed on the second insulator.

26. The device according to claim 23, wherein the first portion of the common electrode is disposed between the second substrate and the second insulator, and the first and second transmission electrodes are disposed on the second insulator, and wherein the second portion of the common electrode is disposed between the first substrate and the first insulator, and the first and second barrier electrodes are disposed on the first insulator.

27. The device according to claim 23, wherein the first and second transmission electrodes are disposed between the second substrate and the second insulator; and the first portion of the common electrode is disposed on the second insulator, and wherein the first and second barrier electrodes are disposed between the first substrate and the first insulator, and the second portion of the common electrode is disposed on the first insulator.

28. The device according to claim 1, wherein the parallax barrier panel is disposed between the display panel and a backlight, or between the parallax barrier panel and the backlight.

29. The device according to claim 1, wherein the display panel is a liquid crystal panel.

30. The device according to claim 1, wherein states of the first and second transmission-zones are opposite to each other at a given time in the three-dimension mode.

31. The device according to claim 1, wherein the parallax barrier panel is a non-luminous type panel including a liquid crystal panel, and the display panel is a luminous type panel including an electro-luminescent panel.

32. A stereoscopic display device comprising:
a display panel displaying images; and
a parallax barrier panel supplying light to the display panel, and including at least one first barrier-zone and first and second transmission-zones disposed between two adjacent first barrier-zones,
wherein each of the first and second transmission-zones supplies and shuts light alternatingly in a three-dimension mode.

33. The device according to claim 32, wherein the parallax barrier panel is a luminous type panel including an electro-luminescent panel, and the display panel is a non-luminous type panel including a liquid crystal panel.

34. A method of driving a stereoscopic display device, the method comprising:
displaying images in a display panel; and
driving a parallax barrier panel having at least one first barrier-zone, and first and second transmission-zones between two adjacent first barrier-zones,
wherein in a three-dimension mode, the driving step includes:
shielding light incident to the first barrier-zone, and
alternatingly shielding and passing light incident to each of the first and second transmission-zones.

35. The method according to claim 34, wherein in a two-dimension mode, the driving step includes passing light incident to the first barrier-zone and the first and second transmission zones.

36. The method according to claim 34, wherein the light-shielding and the light-passing between the first and second transmission-zones are opposite to each other at a given time in the three-dimension mode.

37. The method according to claim 34, wherein the parallax barrier panel further includes a second barrier-zone between the adjacent first and second transmission-zones, and in the three-dimension mode, the driving step shields light incident to the first and second barrier-zones.

38. The method according to claim 34, wherein the parallax barrier panel is a liquid crystal panel, and/or the display panel is a liquid crystal panel.

39. A method of driving a stereoscopic display device, the method comprising:
displaying images in a display panel; and
driving a parallax barrier panel having at least one first barrier-zone, and first and second transmission-zones between two adjacent first barrier zones,
wherein in a three-dimension mode, the driving step includes:
shutting light from the first barrier-zone, and
alternatingly shutting and supplying light from each of the first and second transmission-zones.

40. The method according to claim 39, wherein in a two-dimension mode, the driving step includes:
supplying light from the first barrier-zone and the first and second transmission-zones.

41. The method according to claim 39, wherein the parallax barrier panel is a luminous type panel including an electro-luminescent panel, and the display panel is a non-luminous type panel including a liquid crystal panel.

42. The method according to claim 39, wherein the parallax barrier panel further includes a second barrier-zone between the adjacent first and second transmission-zones, and in the three-dimension mode, the driving step shuts light from the first and second barrier-zones.

* * * * *